J. B. Holmes,

Mosquito Net.

No. 87,849. Patented Mar. 16, 1869.

WITNESSES:

INVENTOR:

United States Patent Office.

J. BURT HOLMES, OF PHILADELPHIA, PENNSYLVANIA.

Letters Patent No. 87,849, dated March 16, 1869.

IMPROVED MOSQUITO-NET.

The Schedule referred to in these Letters Patent and making part of the same.

*To all whom it may concern:*

Be it known that I, J. BURT HOLMES, of the city and county of Philadelphia, and State of Pennsylvania, have invented a new and useful Improvement in Mosquito-Nets; and I do hereby declare the following to be a full, clear, and exact description of the same, sufficient to enable others skilled in the art to which my invention appertains, to make and use the same, reference being had to the accompanying drawings, forming part of this specification, in which—

Figure 1:
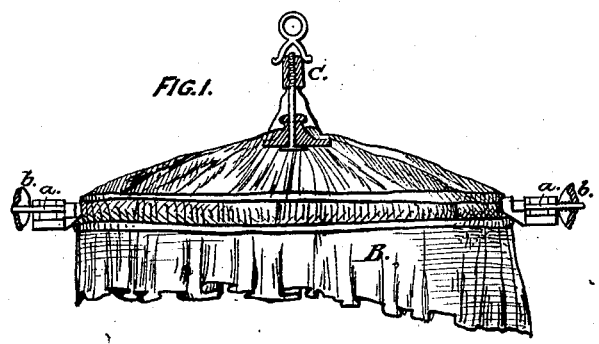
Figure 2:
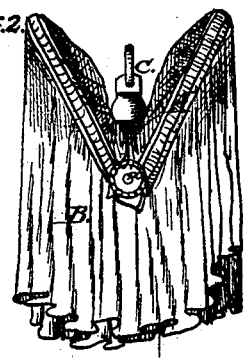

Figure 1 is a longitudinal vertical section through the centre of my improved net, and Figure 2, a side view of the same when folded.

Similar letters of reference indicate corresponding parts in the several figures.

The nature of my invention consists in hinging the frame of a mosquito-net at the centre, so as to fold up and be made portable.

In the drawings—

A is a metallic frame, to which the net B is secured.

In order that the frame may be folded and made portable, I separate it into two parts, and join the sections at the centre by means of bolts, $a$, provided with screw-threads on their outer ends, on which nuts or buttons, $b$, are screwed.

To suspend the net from the ceiling, I attach a hanger, C, to the top of the same.

I do not confine myself to hangers of any particular shape or form, as they may be constructed in any desirable manner.

Among the advantages of my net over those now in use, I may mention—

First, when not in use it may be folded, as shown in fig. 2, thereby rendering it portable and capable of being stowed away in a very small space.

Second, when it is desired to wash the netting, the button $b$ is unscrewed, and the bolt $a$ slipped out. The parts of the frame are then separated, and each drawn out of the net.

Constructed as above described, a simple and cheap net is produced, the advantages of which will be obvious to all.

Having thus described my invention,

What I claim as new, and desire to secure by Letters Patent, is—

Constructing the frame of a mosquito-net in two parts, and connecting them in the centre by means of a bolt and button, substantially as and for the purpose herein described.

To the above, I have signed my name, this 8th day of February, 1869.

J. BURT HOLMES.

Witnesses:
 WM. A. WIEDERSHEIM,
 H. M. WIEDERSHEIM.